United States Patent [19]

Vasquez

[11] Patent Number: 4,520,899
[45] Date of Patent: Jun. 4, 1985

[54] PARACHUTE APPARATUS WITH SHOCK ABSORBER

[76] Inventor: Tulio Vasquez, Carrera 15 No. 39-27, Bogotá, Colombia

[21] Appl. No.: 489,142

[22] Filed: Apr. 22, 1983

[51] Int. Cl.³ .......................... A62B 1/00; B64D 17/00
[52] U.S. Cl. ...................................... 182/230; 244/142
[58] Field of Search .................... 182/3, 230; 244/142, 244/152

[56] References Cited

U.S. PATENT DOCUMENTS

| | | | |
|---|---|---|---|
| 1,009,766 | 11/1911 | Mayes | 244/142 |
| 1,025,386 | 5/1912 | Ensslin | 244/142 |
| 1,444,017 | 2/1923 | Waschek | 244/142 |
| 2,449,813 | 9/1948 | Lawson | 182/3 |
| 2,556,118 | 6/1951 | Sokolik | 182/3 |

*Primary Examiner*—Reinaldo P. Machado
*Attorney, Agent, or Firm*—Browdy and Neimark

[57] ABSTRACT

An apparatus for use in jumping from burning buildings or the like comprising a parachute, restraining means for normally maintaining the parachute in a compact folded condition, a support for the parachute in its folded condition, the parachute remaining connected to the support after the parachute has opened. The apparatus includes a shock absorber including outer and inner tubular members normally in compact telescoped condition but having an extended position when in use.

The apparatus includes a liquid supply connected to the telescopic shock absorber through a one-way valve to move the shock absorber to its in-use extended position. To control deceleration when the apparatus strikes the ground the liquid returns to the liquid supply through a return flow path including a constant pressure valve adjustable to provide a constant deceleration during braking in accordance with the weight of the person using the apparatus.

17 Claims, 3 Drawing Figures

PARACHUTE APPARATUS WITH SHOCK ABSORBER

BACKGROUND OF THE INVENTION

Leonardo da Vinci (1452-1519) drew a quadrangular parachute and stated that: "Anyone that has a twelve by twelve yard canvas can jump from any height with complete tranquillity."

Blanchard claimed the invention of the parachute in 1785.

J. Garreri was the first person in the world to jump with a parachute (1797).

U.S. Pat. No. 221,855 of Nov. 18, 1879, describes a safety device for escaping from fires in buildings. It consists of a small parachute whose cords are fastened to a shell the person wears, in combination with shoes equipped with thick elastic cushions intended to dampen the impact with the earth.

SUMMARY OF THE INVENTION

The present invention relates to a safety device suitable for escaping from a burning building, allowing the user to jump from a window or balcony at a suitable height, i.e., approximately from the sixth floor or higher.

The lifesaving device of the invention includes a telescopic hydraulic shock absorber which is normally in telescoped condition, i.e., the inside telescopic body in its maximum retracted position. The shock absorber in the preferred embodiment of the invention has a damping travel of 1.5 meters. The outside body of the shock absorber ends in its upper part in a valve box, which, in turn, is connected by suitable pipes with a hydropneumatic cylinder of a diameter greater than that of the shock absorber. The hydropneumatic cylinder receives a piston that divides it into an upper compartment containing oil and a lower compartment containing air or a suitable gas.

When the piston of the cylinder moves from its maximum low point to its maximum high point, it will displace a volume of oil equal to the volume required by the telescopic shock absorber for its travel of 1.5 meters. When the hydraulic shock absorber is in its telescoped position, the piston of the hydropneumatic cylinder will be in its maximum low position.

The lower base of the hydropneumatic cylinder is connected by a conduit to a head that houses a perforating needle which is positioned contiguous to a capsule that contains a gas under pressure. The capsule includes a lead seal which when perforated permits gas to escape from the capsule, the gas entering the hydropneumatic cylinder through a passage in its lower wall or base. This causes the piston of the cylinder to compress the oil in the upper part of the cylinder forcing the oil to exit from the cylinder through one of the upper pipes and, through a one-way valve that allows passage of the oil only in the direction of the hydropneumatic shock absorber. This movement of the oil produces rapid expansion of the telescopic shock absorber.

The lifesaving device with the shock absorber in telescoped position has a total height of about 180 centimeters which allows its storage and convenient use on floors with present inside heights.

If the shock absorber were kept stored in a permanently expanded condition, it would not only be difficult but virtually impossible to move it to a suitable place for jumping from the building, especially when it is necessary to go to other floors. The process of jumping with the lifesaving device in such case would be markedly difficult.

The lifesaving device is further characterized by having in its upper part, a folded parachute approximately 250 centimeters in diameter. After jumping, the user will operate a handle located in the upper part of the shock absorber, which, by control with Bowden cables (steel cables with helical covering), releases the parachute and releases the compressed gas contained in the capsule thereby expanding the telescopic shock absorber.

The outside telescopic member of the shock absorber has a seat secured thereto and located some 45 centimeters above the lower base of the inner telescopic member of the shock absorber.

It has been established by induction that a person weighing 50 kilograms who, with the lifesaving device which weighs approximately 20 kilograms, for a total of 70 kilograms, in a free fall from a height of 2600 meters, will reach a maximum velocity of 18 meters per second.

When the lower end of the shock absorber touches the ground, the circular base 35 which may be 15 centimeters in diameter, can adapt itself to different angles of fall due to the provision of a universal joint by means of which circular base 35 is mounted, thereby avoiding having the lower end of the shock absorber bury itself in soft ground. Deceleration will be constant because of a regulated pressure valve which, in addition, makes it possible to adjust the necessary G value depending on the weight of the person and, by an adjustment knob which may be adjusted in accordance with the user's weight, applies suitable pressure to the regulated pressure valve.

It is an object of the invention to provide a life-saving device suitable for aiding a person to escape from a burning building or the like and comprising an assembly of a parachute and a shock absorbing means associated with the parachute, in which the parachute and the associated shock absorbing means are arranged as a compact unit ready for use but may be activated for use in a very short time.

It is a further object of the invention to provide a lifesaving device of the type hereinbefore described, including a parachute and a shock absorbing means associated with the parachute in which the shock absorbing means comprises a pair of telescopic cylinder members which are normally in retracted or telescoped position with respect to each other so as to occupy less space when the life saving device is not in use, but which may be extended very quickly with respect to each other when the life saving device is in use.

It is still a further object of the invention to provide a lifesaving device of the type hereinbefore described including a parachute and a shock absorbing means associated with the parachute, and in which means is provided in cooperation with the shock absorbing means to provide constant deceleration during braking of the person using the life saving device when the life saving device strikes the ground.

Still another object of the invention is to provide a life saving device of the type hereinbefore described including a parachute and a shock absorbing means, and in which means are provided in cooperation with the shock absorbing means for preadjusting the deceleration during braking in accordance with the weight of the person using the life saving device.

Further objects and advantages of the invention will become apparent in connection with the following description taken in conjunction with the accompanying drawings, in which:

DESCRIPTION OF THE PREFERRED EMBODIMENT

Figure 1:
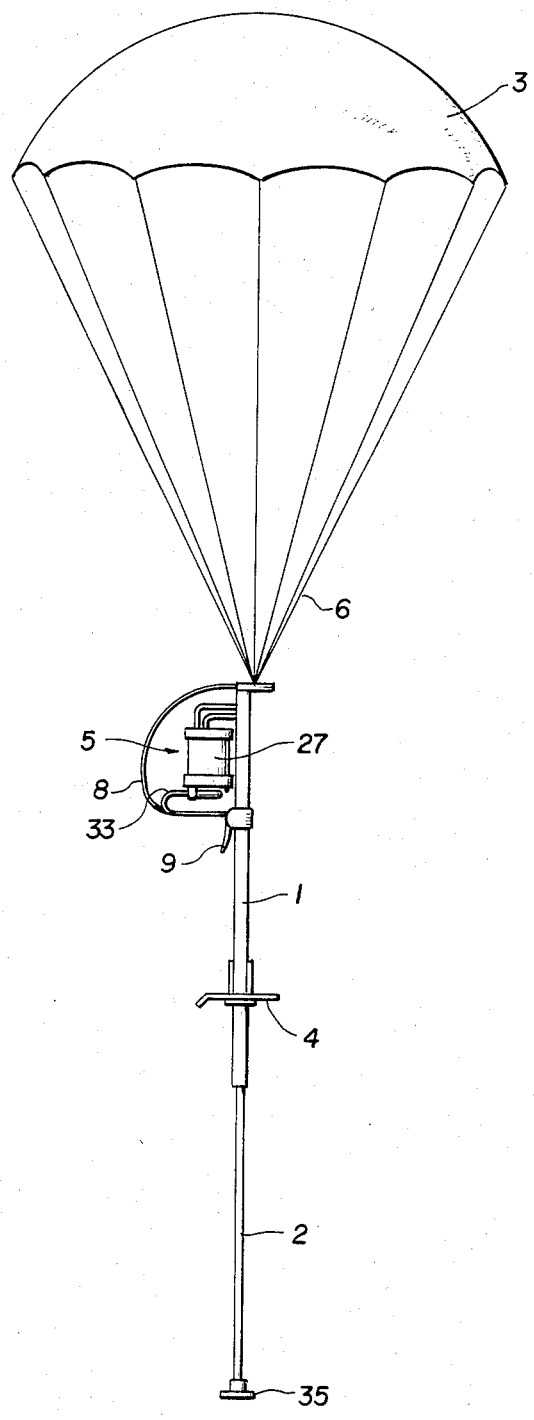
FIG. 1 is a diagrammatic view of the lifesaving device of the invention when in use, with the parachute opened up and with the telescopic members of the shock absorbing means in fully extended position.
Figure 3:
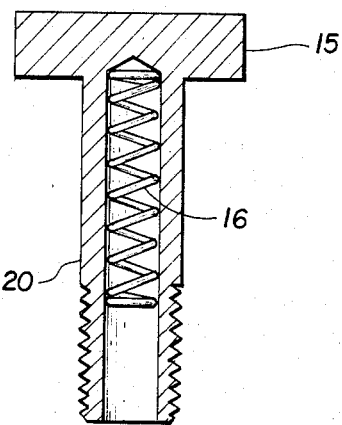
FIG. 3 is a detailed view in vertical section of the hollow threaded shaft which is used to preadjust the deceleration during braking in accordance with the weight of the person using the life saving device.

The invention consists of a lifesaving device suitable for use in jumping from the heights of burning buildings, characterized by having a telescopic shock absorber generally indicated at A including an outer body 1 and an inner body 2, a spring 18 that is associated with a parachute 3, a hydropneumatic cylinder 27, and a seat 4 on which the person using the lifesaving device sits.

Figure 2:
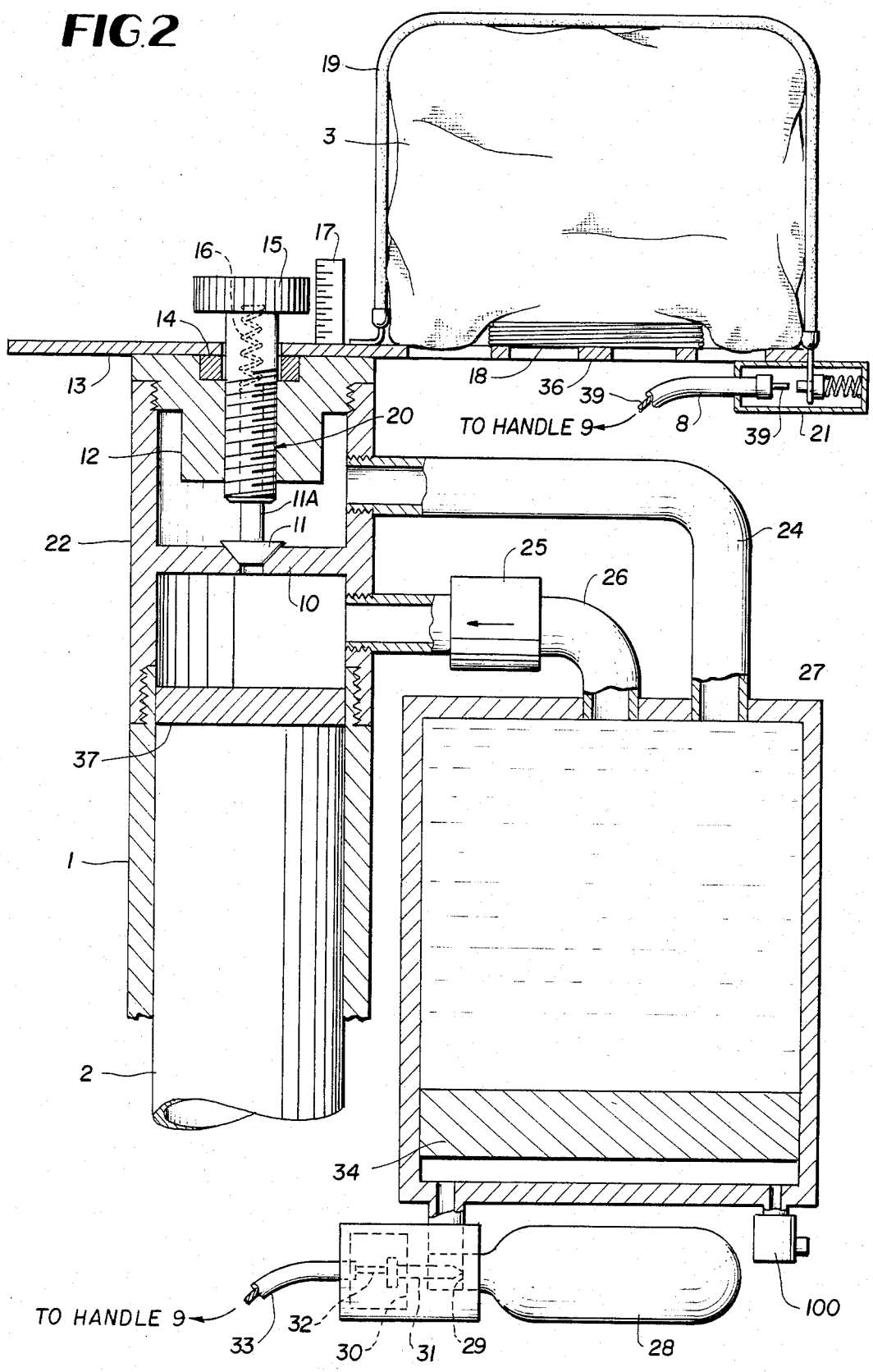
FIG. 2 is a view in sectional elevation, partially schematic, of the lifesaving device in its compact or stored position.

Altogether the lifesaving device, when it is stored ready for use, forms a compact unit that can be handled inside a building since when the hydraulic shock absorber is in telescoped condition, i.e., body 2 telescoped inside body 1, and parachute 3 is folded and supported in folded condition on a perforated plate 36 carried by the upper end of the telescopic assembly. The parachute is maintained in its folded condition by means of elastic cord 19 which is captive since one of its ends is permanently fastened, and the other end is subject to the releasable pressure of spring 21. An expansion spring 18 is positioned under the folded parachute, spring 18 being maintained in compressed condition as seen in FIG. 2 when the parachute is in the stored position shown in FIG. 2. In the condition just described, the lifesaving device forms a unit approximately 190 centimeters high, although when it is unfolded and expanded its length is approximately 650 centimeters.

To jump with the lifesaving device, the person places himself on a window or balcony of the building that he desires to evacuate and which coincides with a spot on the ground that is level and without obstacles. The person fits the body of the shock absorber between his legs, forming an angle of approximately 20 degrees to the vertical so that seat 4 is located between his thighs and the floor, grasping the upper part of body 1 of the shock absorber; as soon as he jumps, he presses the handle 9 (FIG. 1) connected to the two Bowden cables to thereby produce two instantaneous and simultaneous effects as follows: (1) one of the Bowden cables 8 causes the release of the elastic cord 19 that confines the parachute; and (2) the other Bowden cable 33 is connected to the pneumatic head 30 which has striker 31 on its interior; when rigid cable portion 32 of Bowden cable 33 expands it engages striker 31 which in turn perforates lead membrane 29 of cylinder 28 of gas under pressure which allows the gas to enter the lower part of hydropneumatic cylinder 27 to thereby impart movement to piston 34, which, in turn, forces oil from cylinder 27 through pipe 26 and one-way valve 25 to valve box 22, applying pressure on piston 37 which is fixed to inner telescope body 2 of the hydraulic shock absorber, forcing telescopic body 2 to leave its retracted position and in a fraction of a second move to its extended position. This movement of inner telescopic body 2 as just described means that the inside volume of cylinder 27 is equal to or greater than the volume generated by the expansion of piston 37 and the body 2 of the shock absorber.

When parachute 3 has been released by the action of rigid cable wire 39, corresponding to Bowden cable 8, the parachute opens rapidly due to the action of expansion spring 18, the parachute rapidly extending by the action of the wind produced by the free fall, and, because of its small size of approximately 250 centimeters in diameter.

During the controlled fall, the unit adopts the configuration shown in FIG. 1. The person's head and trunk are opposite the position of the hydropneumatic cylinder 27; the yoke of cords 6 of parachute 3 is offset in relation to the axis of the shock absorber and in the direction of the side of the trunk of the person to compensate the center of gravity of the person supported by the lifesaving apparatus.

When plate 35 strikes the ground, because of the inertia of the person supported on the lifesaving device, and the lifesaving device itself, lower body 2 of the shock absorber is forced to retract or telescope into the body of larger diameter, compressing the oil that is in the interior of the outer telescopic body 1. The oil is not able to return to cylinder 27 through the hydropneumatic cylinder pipe 26 because of one-way valve 25, and therefore the oil is forced to return to cylinder 27 through constant pressure valve 11, seat 10, and conduit 24, a constant pressure being established in the oil of the shock absorber and consequently a constant deceleration during braking of the person, his total stopping being produced in about 17/100 seconds if he weighs 50 kg, and being subjected to a deceleration of 11 G.

In order to keep a light person from being subjected to a short braking and consequently to a very high, even though uniform, deceleration, or a heavy person not succeeding in being braked in the travel of 150 centimeters of the shock absorber, and possibly receiving a final sudden fracturing blow, means are provided for adjusting the constant pressure valve in accordance with the weight of the person.

When piston 34 returns at high speed, relief valve 100 allows the gas in the lower part of cylinder 27 to reach a pressure that represents a considerable additional force, allows the gas to escape when it exceeds 4 kg/cm$^2$, for example.

The upper part of valve box 22 includes a head 12 in which is housed a threaded shaft 20 associated with a mechanical seal. The shaft 20 is hollow and on its interior axis houses the stem 11A of valve 11 compressed by a spring 16; the upper part of shaft 20 includes a knob 15, which in association with scale 17 allows the person, before jumping with the lifesaving device, to adjust the pressure of valve 11 in accordance with his weight, by selecting his weight on scale 17.

It is obvious that for those skilled in the art, various changes, additions, and modifications may be introduced, without modifying the scope of the invention, and that the invention is not limited to what has been shown in the drawings and explained in the description. For example, it is possible to increase the capacity of the damping, without increasing the height of the lifesaving devices, by mounting the seat 4 for free vertical movement, but which is normally limited by a pair of shock absorbers equipped with restriction valves that release starting at a high force to permit vertical movement of seat 4, so that if the main shock absorber is exhausted, the person continues to move with vertical speed. Electrical instead of mechanical means may be used to control the parachute, and the gas capsule, means that obviously can be timed, or can be controlled by a stationary cord anchored at the jump site. A hoist located at the top of the shock absorber and operated by a small electric motor or by a stem winding (similar to that of a watch) will allow higher placement of the seat during the fall and then damp the descent by reverse action of the hoist controlled by a centrifugal control. For descents from very great heights it is possible first to trigger a pilot parachute to keep a strong wind from carrying the person away from the landing site; a second trigger will release the main parachute.

I claim:

1. An apparatus for use in jumping from burning buildings or the like, comprising a parachute, restraining means for normally maintaining said parachute in a compact folded condition, first support means for said parachute mounted on said apparatus, means which continue to connect said parachute to said first support means when said restraining means has been released and said parachute has opened, a shock absorber means, said shock absorber means comprising an outer and an inner tubular member telescopically movable with respect to each other from a retracted position corresponding to the storage position of said apparatus to an elongated extended position corresponding to the in-use position of said apparatus, person support means carried by said apparatus at a level below the level at which said parachute is connected to said first support means, first actuator means for causing the release of said restraining means to permit opening of said parachute to its in-use condition, second actuator means for causing said outer and said inner tubular members to move relative to each other from their retracted position to their extended in-use position, and means for substantially simultaneously actuating said first and said second actuator means to cause movement of said parachute to open condition and to cause said relative movement of said tubular members to said extended position.

2. An apparatus as defined in claim 1 comprising a fluid cylinder and means connecting said fluid cylinder to said shock absorber means to permit fluid flow from said fluid cylinder to said shock absorber means whereby to cause movement of said outer and said inner tubular members of said shock absorber relative to each other and thus to move said tubular members to their extended in-use position.

3. An apparatus as defined in claim 1 comprising a hydropneumatic cylinder, a first piston movable in said cylinder, said first piston dividing said cylinder into a first compartment on one side of said first piston, said first compartment being adapted to receive a liquid, and a second compartment on the opposite side of said first piston and receiving a gas, first fluid conduct means fluidly connecting said first compartment of said hydropneumatic cylinder to said shock absorber whereby liquid ejected from said first compartment and flowing through said first fluid conduit means causes relative movement of said outer and inner tubular member to their extended in-use position, and means for admitting gas to said second compartment whereby to cause movement of said first piston in said hydropneumatic cylinder to cause said ejection of liquid from said first compartment.

4. An apparatus as defined in claim 3 in which said means for admitting gas to said second compartment comprises a container adopted to receive a compressed gas therein, means defining a gas flow path from said container to said second compartment, and means actuated by said second actuator means for causing release of gas from said container into said gas flow path and into said second compartment.

5. An apparatus as defined in claim 4 in which said container has a perforatable closure and said means for causing release of gas from said container comprises means for perforating said closure whereby to permit release of gas from said container into said flow path and thus into said second compartment, said means for perforating said container being actuated by said second actuator means.

6. An apparatus as defined in claim 3 comprising a one-way valve in said first fluid conduit means whereby liquid flow between said first compartment and said shock absorber means can move only toward and not away from said shock absorber means.

7. An apparatus as defined in claim 3 in which said inner tubular member of said shock absorber means is movable relative to said outer tubular member, the normally upper end of said inner tubular member defining a second piston, means forming part of said apparatus defining a first chamber above said second piston, said first chamber being bounded at its normally lower end by the normally upper end of said second piston, said first conduit being in fluid communication with said first chamber whereby liquid ejected from said hydropneumatic cylinder enters said first chamber and causes movement of said inner tubular member in a normally downward direction whereby to cause its shock absorber means defined by said inner and outer tubular members to assume its extended condition.

8. An apparatus as defined in claim 7 comprising means forming part of said apparatus and defining a second chamber, valve means controlling fluid communication between said first chamber and said second chamber, a return fluid conduit fluidly communicating said second chamber with said first compartment of said hydropneumatic cylinder, means for adjusting the pressure on said valve means required for said valve means to open to establish fluid communication between said first chamber and said second chamber, and thus whereby to control the return flow of liquid from said first chamber through said second chamber and through said return flow conduit to said first compartment of said hydropneumatic cylinder, and thus whereby to control deceleration during braking of said apparatus.

9. An apparatus as defined in claim 8 including means for adjusting the pressure on said valve means in accordance with the weight of the person using said apparatus.

10. An apparatus as defined in claim 9 including a spring means exerting pressure on said valve means, and means for adjusting the pressure on said spring means whereby to control the pressure on said valve means.

11. An apparatus as defined in claim 7 comprising a ground-engaging plate member carried by the normally lower end of said inner tubular member.

12. An apparatus as defined in claim 11 in which said ground engaging plate member is connected to said inner tubular member by an universal joint.

13. An apparatus as defined in claim 1 comprising an expansion spring member interposed between said parachute and said first support means.

14. An apparatus as defined in claim 1 in said first and said second actuator means each respectively comprise a corresponding Bowden cable.

15. An apparatus as defined in claim 11 comprising a single handle member adopted to be operated by the user of the apparatus, said single handle member being connected to the Bowden cables respectively associated with said first and said second actuator means, whereby movement of said handle is effective to actuate both said first and said second actuator means.

16. An apparatus as defined in claim 1 in which said person support means is a seat adapted to support the person using said apparatus.

17. An apparatus as defined in claim 16 in which said inner tubular member moves relative to said outer tubular member to provide said extended position of said apparatus, and said seat is mounted on said outer tubular member.

* * * * *